Patented May 30, 1944

2,349,936

UNITED STATES PATENT OFFICE 2,349,936

MANUFACTURE OF TITANIUM SULPHATE SOLUTIONS

L'Roche G. Bousquet, Wilmington, Del., David W. Young, Roselle, N. J., and Allan W. Low, Woodside, N. Y., assignors to General Chemical Company, New York, N. Y., a corporation of New York No Drawing. Application June 10, 1941,
Serial No. 397,386

11 Claims. (Cl. 23—117)

This invention deals with manufacture of crystalloidal relatively low acidity factor titanium sulphate solutions. The invention relates to methods for reducing acidity factor of crystalloidal titanium sulphate solutions without disturbing their crystalloidal characteristics. More particularly, the invention is directed to methods for making, from crystalloidal relatively high acidity factor titanium sulphate solutions, crystalloidal titanium sulphate solutions having within certain limits any desired lower acidity factor, for example crystalloidal solutions having acidity factors of around zero or substantially less than zero, i. e., a minus acidity factor.

As known in the art relating to production and use of titanium sulphate solutions, percent "acidity factor" or "factor of acidity" (represented herein by F. A.) of a titanium sulphate solution is the ratio (multiplied by 100) of the so-called free $H_2SO_4$, (i. e., acid not combined with bases or with titanium as $TiOSO_4$) and the titanium equivalent acid based on $TiOSO_4$, (i. e., the acid constituent of $TiOSO_4$ as such). Free acid plus acid combined with titanium to form $TiOSO_4$ as such is designated "active acid". In terminology of the art, zero F. A. represents a condition in which all titanium in solution is present as titanyl sulphate ($TiOSO_4$), and 100% F. A. represents a condition in which all titanium is present as normal tetravalent titanium disulphate, $Ti(SO_4)_2$. Titanium sulphate solution containing less acid than needed to combine with bases other than titanium and to form $TiOSO_4$ with the titanium present is designated as having a minus F. A. For example, in a case where solution conditions are such that substantially all of the titanium has been precipitated out as hydrate, e. g. as a result of neutralization of all of the acid, F. A. of the mother liquor is about minus 100%.

The crystalloidal state of titanium salt solutions is characterized by absence of colloidal titanium compound. A satisfactory test for absence of colloidal titanium is that which shows the absence of coagulated titanium when a sample of the solution to be tested is treated with an equal volume of concentrated (35–37%) hydrochloric acid. Should colloidal titanium content of the sample be substantial, coagulated material though suspended and unsettled is readily visible to the naked eye. If no coagulated material is visible the hydrochloric acid treated sample may be settled for a substantial period of time and filtered or centrifuged in a high-speed centrifuge. If analysis of the filtrate or of the centrifuged liquor shows the same total titanium (calculated as $TiO_2$) content by weight as did the sample prior to hydrochloric acid dilution, the sample tested contained no colloidal titanium. If analysis of the filtrate or the centrifuge liquor shows appreciably less total titanium than that of the sample prior to hydrochloric acid dilution, it will be evident the sample contained colloidal titanium in amount corresponding with the total titanium deficiency of the filtrate or centrifuge effluent subjected to analysis.

Proposals have been made with respect to methods for reducing the F. A. of crystalloidal titanium sulphate solutions. In operations of this nature the principal difficulty involved is in carrying out the procedure in such a way as to avoid formation of colloidal titanium compounds, and with this end in view prior methods have generally involved practice of procedural steps requiring careful control within relatively narrow limits, and also the attention of skilled operators.

The principal object of this invention is provision of methods for reducing acidity factor of crystalloidal titanium sulphate solutions without disturbing their crystalloidal status by procedures the practice of which do not require close chemical control or carefully regulated operating technique. Another important object is to afford methods for reducing acidity of crystalloidal titanium salt solutions in such a way as to produce crystalloidal titanium salt solutions of very low F. A., e. g. minus 45%.

In the production of crystalloidal low F. A. titanium sulphate solutions from crystalloidal high F. A. starting solutions the primarily important features of operation are (a) extraction from the starting solution of some or all of the so-called free $H_2SO_4$, and in the case of manufacture of products of minus F. A. the extraction of not only all of the free sulfuric acid but also some of the $SO_4$ radical combined with titanium to form $TiOSO_4$ as such, and (b) in any event the extraction of $SO_4$ radical in such a way as to avoid formation of any colloidal titanium compounds. This invention provides for accomplishment of these ends in a simple way. The operating advantages afforded by the present improvements are based primarily on the discovery of the facility with which certain organic treating agents act on crystalloidal titanium sulphate solution to extract $SO_4$ and correspondingly reduce the F. A. of the titanium sulphate solution without altering its crystalloidal properties.

Briefly outlined, procedure involved in practice of the process of the invention is as follows. First, there is provided a crystalloidal water-titanium sulphate-iron sulphate starting solution having hereinafter designated characteristics with respect to titanium sulphate and iron (e. g.

ferrous) sulphate contents. The starting solution is thoroughly mixed with certain organic treating or extracting agents which, during intimate contact with the starting solution, act to extract or take up from the starting solution a quantity of the so-called active acid. On cessation of agitation and subsequent to a quiescent settling period, the mass stratifies, forming two easily separable liquid layers. The heavier lower layer comprises principally titanium sulphate and iron sulphate, and the F. A. of this layer is substantially less than that of the starting solution. The lighter upper layer comprises a liquid containing chiefly organic extracting agent, sulphuric acid and water. The layers are separated as by decantation. In the more usual practice of the invention, the lower titanium sulphate containing layer is then diluted with regulated amount of water, and the resulting mass is treated with a second increment of organic extracting agent, permitted to stratify, and the upper and lower layers separated. The F. A. of the lower layer, formed by the second extracting operation, is less than the F. A. of the corresponding solution produced in the first extraction operation. The series of steps of organic extracting agent treatment, stratification, separation, and dilution of the heavy titanium sulphate containing layer is carried out once or however many times may be needed to obtain a final titanium sulphate solution having the sought-for low acidity factor. The principal aspects of the invention lie chiefly in the discovery of a group or classification of organic extracting agents possessing the properties of extracting active acid from crystalloidal titanium sulphate solutions without disturbing their crystalloidal properties and without permanently contaminating the resulting low F. A. titanium sulphate product. To a secondary but hardly less important degree the invention comprises the discovery of suitable characteristics of the starting solutions, and of the feature of readjustment of the titanium sulphate layer of any one extraction cycle to characteristics similar to those of the starting solution of a preceding extraction cycle.

While relating generally to F. A. reduction, and to manufacture of crystalloidal titanium sulphate solutions having F. A. of zero, the invention is directed particularly to production of crystalloidal solutions having a low minus F. A., preferably not higher than minus 18%. We have found that to effect acidity reduction of crystalloidal titanium sulphate, especially to minus quantities, the first feature of importance is that the treatment of the crystalloidal titanium sulphate with the acidity extraction agent should be effected in the presence of appreciable amounts of water. On the basis of our investigations, we believe that in the presence of water some type of hydrolysis forms crystalloidal but weakly bonded sulphuric acid which readily gives up to the extracting agent some of the $SO_4$ normally constituting $SO_4$ of $TiOSO_4$. The quantity of water in the reaction mass (i. e. the mass formed by mixing the starting solution and the acid extracting agent) is widely variable, and $SO_4$ removal from $TiOSO_4$ does not seem to depend upon the presence of any critical proportions of water but evidently proceeds in the presence of any appreciable quantity of water, indications in this connection being that the presence of at least some water is necessary to bring about progressive splitting out of $SO_4$ constituent of $TiOSO_4$.

Minimum and maximum water content of the reaction mass is controlled by two other factors. One procedural step of the instant process comprises the treatment of the titanium sulphate starting solution with the liquid organic extracting agent, which treatment in practice is effected by rapid agitation of a liquid mass consisting of the starting solution and the extracting agent. In instances where the water content of the reaction mass is too low, as acid extraction of the titanium sulphate solution being treated proceeds the mass thickens, and becomes tar-like and unworkable. Hence, the amount of water present during reaction should be such as to avoid this condition and to provide in the mass all during the time of mixing the starting solution and the extracting agent a state of consistency such that the mass may be violently agitated without difficulty. We have also observed that the extracting agents suitable for use in the present process not only extract acid from the titanium sulphate solution but also dehydrate the titanium solution with the result that the extracting agent takes water away from the titanium sulphate. Hence, the reaction mass should contain sufficient water so that the mass as a whole does not thicken during agitation, and also so that the lower titanium sulphate layer, after stratification, is fluid enough to be handled as a liquid.

As indicated, another procedural feature of the present process is the carrying out of the extracting operation in such a way that after the agitation period, the mass will stratify into a lower layer comprising chiefly titanium sulphate and ferrous sulphate and into an upper water-extract agent-acid layer. We have found that where the amount of water present in the reaction mass is relatively great, much of the titanium salt which would otherwise be held in the lower layer passes into the watery upper layer. Further, in cases of too large amounts of water, no or only very little stratification is obtained after completion of the agitating phase, with the result that satisfactory separation of reduced acidity titanium sulphate and the acid carrying extracting agent cannot be secured.

In practice of the invention in the more satisfactory embodiments, a prime feature, aside from prevention of formation of colloidal titanium compounds, is the decrease of the acidity factor to the desired point while effecting economic recovery of titanium in the form of the sought-for low F. A. crystalloidal titanium sulphate solution, and at the same time minimizing titanium loss in the supernatant water-extracting agent-sulphuric acid layer formed after treatment of the starting solution with acidity extracting agent and subsequent to stratification of the reaction products. Attainment of satisfactory titanium recovery makes necessary consideration of certain variable factors which are chiefly the water content of the reaction mass, the titanium and iron concentrations of the starting solution, the ratio of iron to titanium, and the relative quantities of starting solution and acid extracting agent used in any given extracting operation. The importance of the presence and of minimum and maximum quantities of water in the reaction mass is discussed above.

Titanium sulphate solutions most adaptable for use in practice of the present process are the clarified, crystalloidal, moderately high F. A. (e. g. 50–70%) titanium sulphate solutions which are produced by reaction of ilmenite and sulphuric acid and which are well known in the art. Such solutions normally contain substantial amounts of iron almost always in the form of ferrous sulphate. In connection with the above indicated desirability of carrying out the process in such a way as to secure satisfactory titanium recovery in the ultimate crystalloidal low F. A. titanium sulphate solutions, we have observed that the solubility of both $TiOSO_4$ and of $SO_4$ radical in the acid extracting agent increase with the decreasing concentration of the total titanium and iron salts present in the starting solution. Hence, as to the nature of the starting solution, which is to be treated with the acid extracting agent, the important variables are water content, titanium and iron concentrations, and the Fe/TiO$_2$ ratio. To secure from the starting solution the desired acidity reduction, satisfactory recovery of titanium in the ultimate low F. A. product, and to avoid undesirable titanium loss in the water-extracting agent-sulphuric acid layer formed by stratification, we have found that the three variables just mentioned may be accounted for and regulated collectively by providing a crystalloidal titanium sulphate-iron sulphate-water starting solution of suitable F. A. and containing total gpl of Ti (calculated as TiOSO$_4$) and of Fe (calculated as FeSO$_4$) not less than 510 and not more than 1100 and having an Fe/TiO$_2$ ratio of not less than 0.2 and not more than 0.72. Our work shows that in the better embodiment of the invention process, the presence in the reaction mass of some appreciable amount of iron salt, preferably as ferrous sulphate, is desirable, indications being that the iron sulphate depresses transfer of titanium salt into the supernatant water-extracting agent-acid layer. From viewpoint of practicability in making up the starting solutions, the total gpl of Ti and Fe on the one hand and the Fe/TiO$_2$ ratio on the other may be readily controlled, and we find the adjustment of these two factors automatically provides in the reaction mass the desired maximum and minimum concentrations of water and of titanium and iron salts.

To obtain best titanium recovery and most satisfactory overall operating advantages, it is preferred to use a crystalloidal titanium sulphate-iron sulphate-water starting solution containing total gpl of Ti (calculated as TiOSO$_4$) and of Fe (calculated as FeSO$_4$) not less than 575 and not more than 915 and having an Fe/TiO$_2$ ratio of not less than 0.3 and not more than 0.62.

One of the advantages of the invention is that suitable starting solutions may be made by common methods. Starting solutions may be prepared by digesting ground ilmenite with sulphuric acid, clarifying and concentrating the liquor, and removing part of the ferrous sulphate by cooling and crystallization, all as known in the art. Adjustment of starting solutions to within the above indicated characteristics, with respect to water content, titanium and iron, concentrations, and Fe/TiO$_2$ ratio, may be readily secured by concentrating or water-diluting a clarified titanium sulphate-iron sulphate liquor, or by decreasing (e. g. by crystallization or by increasing the iron sulphate content by addition of ferrous sulphate according to the circumstances encountered. Such adjustments may be made easily by one skilled in the art.

The acidity factor of starting solutions is not particularly controlling. It is known that titanium sulphate solutions having F. A. of the order of 35–30% and possibly lower may be made by direct sulphuric attack on titaniferous ores. However, it is customary in order to obtain satisfactory titanium extraction from ore and to form crystalloidal titanium sulphate solutions which are stable and will not hydrolyze on storage to use acid in quantity to form titanium sulphate solutions having F. A. from above say 55 to 100%, general practice being such that crude titanium sulphate solutions resulting from ore-acid digestion operations have acidity factors in the range of about 60–85%. Relatively high F. A. solutions of this general type constitute the commercially more satisfactory starting solutions for making crystalloidal low acidity factor solutions in accordance with the present invention since such high F. A. solutions are not only crystalloidal but are made in a way affording satisfactory titanium recovery from ore. In practice, however, to insure production of an ultimate low F. A. titanium sulphate solution which is crystalloidal, we prefer to use starting solutions having an F. A. of not below about 40%.

With regard to acid extracting agents, we have discovered that certain organic materials possess acid extracting and other physical and chemical properties of such nature as to make possible their advantageous use for acidity reduction of crystalloidal titanium sulphate solutions without disturbing the crystalloidal characteristics of such solutions. We find that certain ketones, alcohols, esters, and ethers of the following properties and characteristics are suitable for purposes of present process: (1) a neutral organic oxygen containing compound; (2) substantially non-reactive with sulphuric acid at room temperature; (3) soluble in water; and having (4) a specific gravity not above 1.034 at 25° C.; (5) a molecular weight of 46.1 to 118.1 inclusive; (6) a dielectric constant of 4 to 24.1 inclusive; and (7) a Sugden's Parachor of 126 to 250 inclusive. Following are specific examples of suitable acid extracting agent falling within the above classification, and all of which materials are neutral organic oxygen containing compounds, substantially non-reactive with sulphuric acid at room temperature, and soluble in water:

| Name of agent | Mol. weight | Sp. gr. 25° C. | Sugden's Parachor | Dielectric constant |
|---|---|---|---|---|
| KETONES | | | | |
| Acetone | 58.1 | .793 | 160.2 | 21.4 |
| Methyl acetone | Mix | .831 | | |
| M-E ketone | 72.1 | .809 | 199.2 | 18.4 |
| Di ethyl ketone | 86.1 | .815 | 238.2 | 17.3 |
| Cyclohexanone | 98.1 | .946 | About 250 | 18.2 |
| ALCOHOLS | | | | |
| Ethanol | 46.1 | .7851 | 126.8 | 24.1 |
| 1-propanol | 60.1 | .8001 | 164.4 | 20.08 |
| 2-propanol | 60.1 | .7810 | 165.2 | 18.55 |
| 1-butanol | 74.1 | .8057 | 203.9 | 16.96 |
| 2-butanol | 74.1 | .8025 | 200.4 | 15.77 |
| ESTERS | | | | |
| Methyl acetate | 74.1 | .908 | 177.2 | 7.2 |
| Ethyl acetate | 88.1 | .886 | 217.2 | 6.5 |
| ETHERS | | | | |
| Diethyl "Cellosolve" | 118.1 | 0.849 | About 250 | About 4 |
| Ether | 74.1 | .707 | 211.7 | 4.4 |
| 1-4-dioxane | 88.1 | 1.034 | About 198 | |

Sugden's parachor is represented by $$P = \frac{M\gamma^\kappa}{D-d}$$

where $M$ is a molecular weight of the liquid, $D$ is density, $\gamma$ its surface tension, and $d$ is the density of the vapor, all measured at the same temperature. As known, the parachor is an expression of the molecular volume and equals 0.78 times the critical volume, and a comparison of the parachors of liquids is equivalent to a comparison of their molecular volumes for temperatures at which they have equal surface tensions. See Hackh "A Chemical Dictionary," P. Blakiston's Son & Company, Inc., Philadelphia, 1929, and Getman "Outlines of Theoretical Chemistry," John Wiley & Sons, Inc., New York, 1931.

Of the extracting agents indicated, the ketones and alcohols are preferred, and of these groups the more satisfactory results may be obtained by use of acetone, methyl acetone and methyl ethyl ketone on the one hand, and 1-propanol, 2-propanol and 1-butanol on the other. Of the esters, methyl acetate is preferred.

Another feature of importance in practice of the present process is the relative quantities of starting solution and extracting agent used. To obtain satisfactory results, we treat one part by volume of starting solution with not less than 0.75 part by volume of extracting agent. In the preferred embodiments, to secure most efficient acidity reduction, titanium recovery and economic operation, we employ one volume of starting solution with not less than an equal volume of extracting agent. Although greater amounts of extracting agent may be used, no particular operating advantage arises.

Other operating features may be understood from the following general outline of the procedure involved in practice of the improvements constituting the invention. The titanium sulphate starting solution, of the composition and properties noted, is mixed with say one to two parts by volume of the organic acid extracting agent (e. g. acetone) at room temperature in a closed vessel. Use of a closed vessel is preferred to prevent possible vaporization and loss of extracting agent. Another operating advantage is that the extraction process may be carried out at room temperature. No heat is developed by the reaction, and hence there is no tendency, because of high temperature conditions, to form colloidal titanium compounds. In this connection it is noted that temperatures should always be less than about 60° C. to avoid formation of colloidal titanium.

The mass is agitated to such a degree as to prevent the extracting agent from separating from the titanium solution and forming two separate layers. The period of mixing and agitation need be only about 10 minutes and not more than about 30 minutes, optimum mixing depending upon the particular operation. The mass is allowed to stratify and the extracting agent-water-H₂SO₄ mixture separates from the titanium salt solution. Stratification ordinarily requires about 30 minutes. The lower titanium liquor layer retains some of the extracting agent, but at this stage recovery of the latter is unimportant. The extracting agent-water-acid layer is drawn off into a storage tank for further treatment. Water is then added to the titanium sulphate solution which now has an F. A. less than that of the initial starting solution. Primary purpose of adding water is to bring the titanium sulphate solution to a viscosity low enough to permit ready and thorough mixing with another quantity of extracting agent of about the same volume as initially used. Hence, the amount of water added is preferably that sufficient to bring the titanium sulphate layer back to about the same conditions of fluidity as was the starting solution. The quantity of added water may be gauged also by the amount of water needed to bring the titanium sulphate layer back to the same $TiO_2$ concentration as the starting solution. The readjusted titanium solution is treated again with a second volume of fresh extracting agent as in the previous operation. After stratification and separation, the titanium solution is analyzed to determine whether acid reduction has been carried to the desired point. If not, treatment is repeated until the desired low F. A. is obtained. The resulting basic titanium liquor may be diluted with water to the desired final $TiO_2$ concentration and vacuum distilled to vaporize off the small amount of extracting agent held by the titanium solution. It will be understood that distillation is carried out under conditions of temperature and reduced pressure so as to distill off the residual extracting agent without raising the temperature of the titanium solution above 60° C., and in the case of very low F. A. solutions not above 40–50° C. The extracting agent condensate is added to the extracts obtained in the previous steps, and the titanium solution left in the vacuum still constitutes the low F. A. product of the process.

The combined extracting agent-water-acid layers may be distilled in known way to recover the extracting agent in substantially pure form.

Following are examples of practice of the invention. The crystalloidal relatively high F. A. starting solutions used were prepared by digesting ground ilmenite with sulphuric acid, clarifying and concentrating the liquor, and removing part of the ferrous sulphate by cooling and crystallization, all as known in the art. Where necessary, the starting solutions were brought to within the previously indicated compositions with regard to water content, Ti and Fe concentrations, and Fe/$TiO_2$ ratio, by concentration or dilution with water, or by removal or addition of iron sulphate. In the starting solutions of the examples, it will be understood that minor amounts of impurities are present, but for practical purposes it may be considered that in each case, aside from the constituents listed, the balance of each solution is water.

In these examples $TTiO_2$ represents total titanium concentration calculated as $TiO_2$, $RTiO_2$ represents reduced titanium sulphate (titanous sulphate), $TH_2SO_4$ represents total $H_2SO_4$, $FH_2SO_4$ represents free $H_2SO_4$, $AH_2SO_4$ represents active $H_2SO_4$, and % F. A. represents factor of acidity or acidity factor, and mention of "$TiO_2$ concentration" is intended to mean titanium concentration calculated as $TiO_2$.

EXAMPLE I

The crystalloidal titanium sulphate starting solution used analyzed:

| | |
|---|---:|
| $TTiO_2$ _____g.p.l__ | 189 |
| $RTiO_2$ _____ | Present |
| TFe _____ | 79 |
| $TH_2SO_4$ _____ | 517 |
| $FH_2SO_4$ _____ | 147.5 |
| $AH_2SO_4$ _____ | 378.5 |
| Per cent F. A._____ | 63 |
| Fe/$TiO_2$ _____ | 416 |

In this solution, the total g.p.l. of Ti calculated as TiOSO₄ and Fe calculated as FeSO₄ was 592.9. This liquor was extracted three times with three volumes of acetone each equalling the volume of the starting solution. After each extraction and after each acetone-acid-water layer had been decanted, water was added to the titanium liquor to reduce viscosity so that the resulting liquor could be mixed readily with a second increment of acetone.

Acid extraction and residual acetone removal from the final titanium solution were carried out in a steam-jacketed cone-bottom lead tank provided with an Eppenbach No. 2 Homo mixer. Attached to the top of the tank was a Vigreaux column and an adequate water condenser for use in separating residual acetone from the extracted titanium liquor product. Provision was made to carry out this distillation at reduced pressure, and also to cool the acetone-titanium liquor mixture during extraction by circulating water through the jacket also used for heating with steam. The three extractions are summarized as follows.

|  | Extraction No. | | |
|---|---|---|---|
|  | 1 | 2 | 3 |
| Volume Ti solution _____ liters__ | 8 | (¹) | (²) |
| Volume acetone _____ do ____ | 8 | 8 | 8 |
| Mixing time _____ minutes__ | 5 | 5 | 5 |
| Mixing speed _____ R. P. M__ | 1,500 | 1,500 | 1,500 |
| Volume acetone decanted ___ liters__ | 9 | 11 | 11.5 |
| Volume H₂O added _____ do ____ | 2.8 | 3.0 | 3.2 |
| Mixing time to dissolve Ti solution in H₂O _____ minutes__ | 5 | 5 | 5 |
| Mixing speed _____ R. P. M__ | 7,500 | 7,500 | 7,500 |

¹ Mixed Ti-H₂O liquor from #1.
² Mixed Ti-H₂O liquor from #2.

RESULTS
Analysis

|  | Extracting agent layer extraction No. | | |
|---|---|---|---|
|  | 1 | 2 | 3 |
| Volume decanted _____ liters__ | 9 | 11 | 11.5 |
| Sp. gr. at 25° C _____ | .966 | .912 | .910 |
| TTiO₂ _____ g.p.l__ | 4.5 | 8.4 | 9.5 |
| Total TiO₂ _____ grams__ | 40.5 | 92.4 | 109.3 |
| Ti solution after final extraction and dilution: | | | |
| TTiO₂ _____ g.p.l__ | 150 | 140 | 140 |
| Fe _____ | 41.7 | 42.8 | 43.9 |
| TH₂SO₄ _____ | 295 | 241 | 217 |
| F. A _____ percent__ | +20.5 | −3.15 | −15.3 |

Temperature during the entire extraction operation did not exceed 50° C. The minus 18.3% F. A. final product was crystalloidal by the herein noted test.

The final titanium liquor was heated in the extraction tank at temperature of about 50° C. and under vacuum of about 26 inches to remove the residual acetone and the acetone vapors were condensed. The acetone condensate thus obtained, representing 4.8% of the total, was added to the three extracts, and the mixture transferred to the extraction apparatus after the finished low F. A. titanium product had been removed. The acetone was distilled over at the rate of 4 liters per hour at B. P. 56–58° C.

Recoveries

TiO₂  TTiO₂  1512 g. in starting solution
              242.2 g. in extracting agent
              ―――
              1269.8 g. in final product $$\frac{1269.8}{1512} \times 100 = 84\%$$

Titanium recovery in the product was unnecessarily low on account of use of too large a volume of diluting water after the first and second extractions.

Acetone

|  | Liters |
|---|---|
| Total acetone used _____ | 24 |
| Total acetone recovery _____ | 23.43 |
| Loss _____ | 0.57 |

$$\frac{23.43}{24} \times 100 = 97.59\% \text{ recovery}$$

EXAMPLE II

By starting with a higher TiO₂ concentration, and by using less dilution water after each extraction, the TiO₂ recovery was increased. The starting solution analyzed:

| TTiO₂ _____ g.p.l__ | 213 |
|---|---|
| RTiO _____ | Present |
| Fe _____ | 58.6 |
| Percent F. A _____ | 52 |
| Fe/TiO₂ _____ | .275 |

In this solution, the total g.p.l. of Ti calculated as TiOSO₄ and Fe calculated as FeSO₄ was 585.4.

|  | Extraction No. | | |
|---|---|---|---|
|  | 1 | 2 | 3 |
| Volume Ti liquor _____ c. c__ | 500 | (¹) | (²) |
| Volume acetone _____ do__ | 500 | 500 | 500 |
| Mixing time _____ minutes__ | 5 | 5 | 5 |
| Mixing speed _____ R. P. M__ | 1,500 | 1,500 | 1,500 |
| Settling time _____ minutes__ | 10 | 10 | 10 |
| Volume acetone decanted __ c. c__ | 625 | 585 | 580 |
| Volume H₂O added _____ do__ | 100 | 100 | 100 |
| Mixing time to dil. Ti solution _ minutes__ | 5 | 5 | 5 |
| Volume final Ti liquor _____ | _____ | _____ | 465 |

¹ Dil. liq. from #1.
² Dil. liq. from #2.

Analysis

|  | Acetone layer extraction No. | | |
|---|---|---|---|
|  | 1 | 2 | 3 |
| Volume _____ c. c__ | 625 | 585 | 580 |
| Sp. gr. at 25° C _____ | .978 | .886 | .878 |
| TTiO₂ _____ g.p.l__ | 5.74 | 1.67 | 3.05 |
| Fe _____ | 4.45 | .81 | .51 |
| TH₂SO₄ _____ | 114 | 40.6 | 27.3 |
| TTiO₂ _____ grams__ | 3.58 | .98 | 1.77 |

TiO₂ recovery:

TTiO₂ in Ti liquor treated _____ g__ 106.5
TTiO₂ found in acetone _____ 6.33
                                       ―――
TTiO₂ in final titanium product _____ 100.17

$$\frac{100.2}{106.5} \times 100 = 94.1\% \text{ recovery}$$

|  | Analysis of Ti liquor at various stages after extraction No. | | |
|---|---|---|---|
|  | 1 | 2 | 3 |
| Volume final _____ c. c__ | _____ | _____ | 465 |
| TTiO₂ _____ g.p.l__ | 213 | 211 | 217 |
| Fe _____ | 54.6 | 46.4 | 49.6 |
| TH₂SO₄ _____ | 389 | 338 | 302 |
| F. A _____ percent__ | +12.3 | +.387 | −19.2 |
| Sp. gr. at 25° C _____ | 1.490 | 1.444 | 1.404 |

EXAMPLE III

In this example an extremely basic titanium liquor was made. Procedure used was about the same as in previous examples but more diluting water was added to the titanium solution between extractions. This gave a lower $TiO_2$ recovery, but also a greater acid reduction. The starting solution used was the same as in Example I.

|  | Extraction No. | | |
| --- | --- | --- | --- |
|  | 1 | 2 | 3 |
| Volume Ti liquor_____c. c__ | 500 | 500 | 500 |
| Volume acetone_____c. c__ | 500 | 500 | 500 |
| Mixing time_____minutes__ | 5 | 5 | 5 |
| Mixing speed_____R. P. M__ | 1,500 | 1,500 | 1,500 |
| Settling time_____minutes__ | 10 | 10 | 10 |
| Volume acetone decanted_____c. c__ | 595 | 690 | 710 |
| Volume H₂O added to Ti solution_c. c__ | 190 | 240 | 285 |
| Mixing time to dil. Ti solution__minutes__ | 7 | 3 | 3 |
| Volume final liquor_____c. c__ |  |  | 520 |

Analysis

|  | Acetone layer extraction No. | | |
| --- | --- | --- | --- |
|  | 1 | 2 | 3 |
| Volume_____c. c__ | 595 | 690 | 710 |
| Sp. gr. at 25° C_____ | .98 | .92 | .94 |
| TTiO₂_____ | 8.5 | 11.1 | 20.4 |
| Fe_____ | 2.6 | 3.8 | 6.1 |
| TH₂SO₄_____ | 119.0 | 80.3 | 54.0 |
| TTiO₂_____grams__ | 5.06 | 7.66 | 14.48 |

Analysis of Ti liquor at each step

|  | After extraction No. | | |
| --- | --- | --- | --- |
|  | 1 | 2 | 3 |
| Volume_____c. c__ | 500 | 510 | 550 |
| TTiO₂_____ | 181 | 148 | 122 |
| Fe_____ | 67 | 53.6 | 47.7 |
| TH₂SO₄_____ | 320 | 217 | 166 |
| F. A._____per cent__ | −8.92 | −32.2 | −45.0 |

As shown, the final titanium sulphate product had a minus 45% F. A. Recovery of $TiO_2$ was 71.1%.

EXAMPLE IV 500 c. c. Ti starting solution was extracted twice with 500 c. c. portions of 1-propanol. The starting solution analyzed:

| | |
| --- | --- |
| TTiO₂_____ | 223 |
| RTiO₂_____ | Present |
| Fe_____ | 84 |
| TH₂SO₄_____ | 585.7 |
| FH₂SO₄_____ | 164.5 |
| AH₂SO₄_____ | 438.5 |
| Percent F. A._____ | 60 |
| Ratio Fe/TiO₂_____ | .377 | and the total g. p. l. of Ti calculated as $TiOSO_4$ and Fe calculated as $FeSO_4$ was 674.5.

A twenty minute period of agitation at 1100 R. P. M. with Eppenbach Homo mixer was used for extraction, and the treated mixture settled for 1 hour. 487 c. c. of 1-propanol-acid-water layer was decanted. The volume of the titanium liquor was brought up to 500 c. c. with H₂O and agitated. This liquor was given a second extraction with 500 c. c. of 1-propanol. After the separation into layers and decanting the solvent layer, the titanium fraction (309 c. c.) was diluted with water to 500 c. c. volume. The analysis of the final product and recoveries were:

Product

| | |
| --- | --- |
| TTiO₂_____g. p. l__ | 212 |
| RTiO₂_____ | Nil |
| TFe_____ | 81.7 |
| TH₂SO₄_____ | 389.1 |
| FH₂SO₄_____ | −14.4 |
| AH₂SO₄_____ | 245.6 |
| Per cent F. A._____ | −5.54 |
| Ratio Fe/TiO₂_____ | .385 |
| TiO₂ recovered_____per cent__ | 95.1 |

EXAMPLE V 25 parts by volume of starting solution A were extracted twice, each time with 25 parts by volume of 2-butyl alcohol. In the starting solution, the total g. p. l. of Ti calculated as $TiOSO_4$ and Fe calculated as $FeSO_4$ was 595.3. After thorough agitation the mixture separated into layers. The solvent layer (27 parts by volume) of the first extraction showed the following composition (Soln. B) while the final titanium sulphate product after the second extraction analyzed as shown by Soln. C.

|  | Solution | | |
| --- | --- | --- | --- |
|  | A | B | C |
| TTiO₂_____g. p. l__ | 190.5 | Nil____ | 189.3 |
| RTiO₂_____ | 5.6 |  | 5.4 |
| Fe_____ | 78.8 | Nil____ | 78.7 |
| TH₂SO₄_____ | 566 | 89.4 | 365.4 |
| FH₂SO₄_____ | 195 |  | −5.0 |
| AH₂SO₄_____ | 428 |  | 227.2 |
| F. A._____percent__ | 83.6 |  | −2.15 |
| Sp. gr._____ | 1.585 | .8285 |  |
| Ratio Fe/TiO₂_____ | .414 |  | .415 |

$TiO_2$ recovery was 99.4%.

EXAMPLE VI 100 parts by volume of starting solution D was extracted twice with (1) 200 parts by volume and (2) 100 parts by volume of methyl ethyl ketone with the following results. In the starting solution, the total g. p. l. of Ti calculated as $TiOSO_4$ and Fe calculated as $FeSO_4$ was 595.3.

| Solution | D | Ti product after 1st extr. | Ti product after 2nd extr. |
| --- | --- | --- | --- |
| TTiO₂_____g. p. l__ | 190.5 | 206 | 203 |
| RTiO₂_____ | 5.6 | Present | Trace |
| TFe_____ | 78.8 | 85 | 83.4 |
| TH₂SO₄_____ | 566 | 432.2 | 387 |
| FH₂SO₄_____ | 195 | 31.2 | −8.5 |
| AH₂SO₄_____ | 428 | 283.2 | 240.5 |
| F. A._____percent__ | +83.6 | +12.4 | −3.4 |
| Sp. gr._____ | 1.585 |  |  |
| Ratio Fe/TiO₂_____ | .413 |  | .41 |

$TiO_2$ recovery was 98.1%.

In all of the above examples, all of the intermediate and final product solutions were crystalloidal by the hereindescribed test for the absence of colloidal titanium compound.

We claim:

1. The method for making a crystalloidal titanium sulphate solution of predetermined acidity factor not higher than zero by a plurality of acid extraction operations which method comprises (1) providing a crystalloidal water-titanium sulphate-iron sulphate starting solution of acidity factor not less than 40% and containing total g. p. l. of Ti calculated as $TiOSO_4$ and Fe calculated as $FeSO_4$ not less than 510 and not more than 1100 and having an Fe$_4$/TiO$_2$ ratio of not less than 0.2 and not more than 0.72, (2) agitating the starting solution with not less than 0.75 part by volume of a liquid extracting agent comprising a neutral organic oxygen containing compound, substantially non-reactive with sulphuric acid at room temperature, soluble in water, and having specific gravity not above 1.034 at 25° C., a molecular weight of 46.1–118.1, and a dielectric constant of 4–24.1, (3) forming from the mass resulting from step (2) a titanium sulphate solution layer and an extracting agent-acid-water layer, (4) separating said layers, (5) adding to the titanium sulphate solution layer, having acidity factor less than that of said starting solution, water in amount to form a mass of viscosity low enough to permit ready mixing with another volume of extracting agent, and (6) subjecting the diluted mass resulting from step (5) to further acid extraction operation comprising repetition of steps (2) to (5) inclusive, the final extraction operation comprising repetition of steps (2) to (4) inclusive, and the number of extraction operations being such as to effect formation of an ultimate separated titanium sulphate solution layer having said predetermined acidity factor.

2. The method for making a crystalloidal titanium sulphate solution of predetermined acidity factor not higher than zero by a plurality of acid extraction operations which method comprises (1) providing a crystalloidal water-titanium sulphate-iron sulphate starting solution of acidity factor not less than 40% and containing total g. p. l. of Ti calculated as TiOSO$_4$ and Fe calculated as FeSO$_4$ not less than 575 and not more than 915 and having an Fe/TiO$_2$ ratio of not less than 0.3 and not more than 0.62, (2) agitating the starting solution with not less than one part by volume of a liquid extracting agent comprising a neutral organic oxygen containing compound, substantially non-reactive with sulphuric acid at room temperature, soluble in water, and having specific gravity not above 1.034 at 25° C., a molecular weight of 46.1–118.1, and a dielectric constant of 4–24.1, (3) forming from the mass resulting from step (2) a titanium sulphate solution layer and an extracting agent-acid-water layer, (4) separating said layers, (5) adding to the titanium sulphate solution layer, having acidity factor less than that of said starting solution, water in amount to form a mass of viscosity low enough to permit ready mixing with another volume of extracting agent, and (6) subjecting the diluted mass resulting from step (5) to further acid extraction operation comprising repetition of steps (2) to (5) inclusive, the final extraction operation comprising repetition of steps (2) to (4) inclusive, and the number of extraction operations being such as to effect formation of an ultimate separated titanium sulphate solution layer having said predetermined acidity factor.

3. The method for making a crystalloidal titanium sulphate solution of predetermined acidity factor not higher than minus 18 by a plurality of acid extraction operations which method comprises (1) providing a crystalloidal water-titanium sulphate-iron sulphate starting solution of acidity factor not less than 40% and containing total g. p. l. of Ti calculated as TiOSO$_4$ and Fe calculated as FeSO$_4$ not less than 510 and not more than 1100 and having an Fe/TiO$_2$ ratio of not less than 0.2 and not more than 0.72, (2) agitating the starting solution with not less than 0.75 part by volume of a liquid extracting agent comprising a neutral organic oxygen containing compound, substantially non-reactive with sulfuric acid at room temperature, soluble in water, and having a specific gravity not above 1.034 at 25° C., a molecular weight of 46.1–118.1, and a dielectric constant of 4–24.1, (3) forming from the mass resulting from step (2) a titanium sulphate solution layer and an extracting agent-acid-water layer, (4) separating said layers, (5) adding to the titanium sulphate solution layer, having acidity factor less than that of said starting solution, water in amount to form a mass of viscosity low enough to permit ready mixing with another volume of extracting agent, and (6) subjecting the diluted mass resulting from step (5) to further acid extraction operation comprising repetition of steps (2) to (5) inclusive, the final extraction operation comprising repetition of steps (2) to (4) inclusive, and the number of extraction operations being such as to effect formation of an ultimate separated titanium sulphate solution layer having acidity factor not higher than minus 18%.

4. The method for making a crystalloidal titanium sulphate solution of predetermined acidity factor not higher than zero by a plurality of acid extraction operations which method comprises (1) providing a crystalloidal water-titanium sulphate-iron sulphate starting solution of acidity factor not less than 40% and containing total g. p. l. of Ti calculated as TiOSO$_4$ and Fe calculated as FeSO$_4$ not less than 510 and not more than 1100 and having an Fe/TiO$_2$ ratio of not less than 0.2 and not more than 0.72, (2) agitating the starting solution with not less than 0.75 part by volume of a liquid extracting agent of the group consisting of alcohols, ketones and esters, said agent comprising a neutral organic oxygen containing compound, substantially non-reactive with sulphuric acid at room temperature, soluble in water, and having specific gravity not above 1.034 at 25° C., a molecular weight of 46.1–118.1, and a dielectric constant of 4–24.1, (3) forming from the mass resulting from step (2) a titanium sulphate solution layer and an extracting agent-acid-water layer, (4) separating said layers, (5) adding to the titanium sulphate solution layer, having acidity factor less than that of said starting solution, water in amount to form a mass of viscosity low enough to permit ready mixing with another volume of extracting agent, and (6) subjecting the diluted mass resulting from step (5) to further acid extraction operation comprising repetition of steps (2) to (5) inclusive, the final extraction operation comprising repetition of steps (2) to (4) inclusive, and the number of extraction operations being such as to effect formation of an ultimate separated titanium sulphate solution layer having said predetermined acidity factor.

5. In the method for reducing the acidity factor of a crystalloidal titanium sulphate solution by acid extraction therefrom and without disturbing the crystalloidal properties thereof, the steps comprising (1) providing a crystalloidal water-titanium sulphate-iron sulphate starting solution containing total g. p. l. of Ti calculated as TiOSO$_4$ and Fe calculated as FeSO$_4$ not less than 575 and not more than 915 and having an Fe/TiO$_2$ ratio of not less than 0.3 and not more than 0.62, (2) agitating the starting solution with not less than one part by volume of a liquid extracting agent comprising a neutral organic oxygen containing compound substantially non-reactive with sulfuric acid at room temperature, soluble in water, and having specific gravity not above 1.034 at 25° C., a molecular weight of 46.1–118.1, and a dielectric constant of 4–24.1, (3) forming from the mass resulting from step (2) a titanium sulphate solution layer and an extracting agent-acid-water layer, and (4) separating said layers to recover the titanium sulphate solution layer having acidity factor less than that of said starting solution.

6. The method for making a crystalloidal titanium sulphate solution of predetermined acidity factor not higher than zero by a plurality of acid extraction operations which method comprises (1) providing a crystalloidal water-titanium sulphate-iron sulphate starting solution of acidity factor not less than 40% and containing total g. p. l. of Ti calculated as $TiOSO_4$ and Fe calculated as $FeSO_4$ not less than 510 and not more than 1100 and having an $Fe/TiO_2$ ratio of not less than 0.2 and not more than 0.72, (2) agitating the starting solution with not less than 0.75 part by volume of acetone, (3) forming from the mass resulting from step (2) a titanium sulphate solution layer and an acetone-acid-water layer, (4) separating said layers, (5) adding to the titanium sulphate solution layer, having an acidity factor less than that of said starting solution, water in amount to form a mass having a viscosity low enough to permit ready mixing with another volume of acetone, and (6) subjecting the diluted mass resulting from step (5) to further acid extraction operation comprising repetition of steps (2) to (5) inclusive, the final extraction operation comprising repetition of steps (2) to (4) inclusive only, and the number of extraction operations being such as to effect formation of an ultimate separated titanium sulphate solution layer having said predetermined acidity factor.

7. The method for making a crystalloidal titanium sulphate solution of predetermined acidity factor not higher than zero by a plurality of acid extraction operations which method comprises (1) providing a crystalloidal water-titanium sulphate-iron sulphate starting solution of acidity factor not less than 40% and containing total g. p. l. of Ti calculated as $TiOSO_4$ and Fe calculated as $FeSO_4$ not less than 510 and not more than 1100 and having an $Fe/TiO_2$ ratio of not less than 0.2 and not more than 0.72, (2) agitating the starting solution with not less than 0.75 part by volume of a propanol, (3) forming from the mass resulting from step (2) a titanium sulfate solution layer and a propanol-acid-water layer, (4) separating said layers, (5) adding to the titanium sulphate solution layer, having an acidity factor less than that of said starting solution, water in amount to form a mass having a viscosity low enough to permit ready mixing with another volume of a propanol, and (6) subjecting the diluted mass resulting from step (5) to further acid extraction operation comprising repetition of steps (2) to (5) inclusive, the final extraction operation comprising repetition of steps (2) to (4) inclusive only, and the number of extraction operations being such as to effect formation of an ultimate separated titanium sulfate solution layer having said predetermined acidity factor.

8. In the method for reducing the acidity factor of a crystalloidal titanium sulphate solution by acid extraction therefrom and without disturbing the crystalloidal properties thereof, the steps comprising (1) providing a crystalloidal water-titanium sulphate-iron sulphate starting solution containing total g. p. l. of Ti calculated as $TiOSO_4$ and Fe calculated as $FeSO_4$ not less than 510 and not more than 1100 and having an $Fe/TiO_2$ ratio of not less than 0.2 and not more than 0.72, (2) agitating the starting solution with not less than 0.75 part by volume of a liquid extracting agent comprising a neutral organic oxygen containing compound, substantially non-reactive with sulphuric acid at room temperature, soluble in water, and having specific gravity not above 1.034 at 25° C., a molecular weight of 46.1–118.1, and a dielectric constant of 4–24.1, (3) forming from the mass resulting from step (2) a titanium sulphate solution layer and an extracting agent-acid-water layer, and (4) separating said layers to recover the titanium sulphate solution layer having acidity factor less than that of said starting solution.

9. In the method for reducing the acidity factor of a crystalloidal titanium sulphate solution by acid extraction therefrom and without disturbing the crystalloidal properties thereof, the steps comprising (1) providing a crystalloidal water-titanium sulphate-iron sulphate starting solution containing total g. p. l. of Ti calculated as $TiOSO_4$ and Fe calculated as $FeSO_4$ not less than 510 and not more than 1100 and having an $Fe/TiO_2$ ratio of not less than 0.2 and not more than 0.72, (2) agitating the starting solution with not less than 0.75 part by volume of a liquid extracting agent of the group consisting of alcohols, ketones and esters, said agent comprising a neutral organic oxygen containing compound substantially non-reactive with sulfuric acid at room temperature, soluble in water, and having specific gravity not above 1.034 at 25° C., a molecular weight of 46.1–118.1, and a dielectric constant of 4–24.1, (3) forming from the mass resulting from step (2) a titanium sulphate solution layer and an extracting agent-acid-water layer, and (4) separating said layers to recover the titanium sulphate solution layer having acidity factor less than that of said starting solution.

10. In the method for reducing the acidity factor of a crystalloidal titanium sulphate solution by acid extraction therefrom and without disturbing the crystalloidal properties thereof, the steps comprising (1) providing a crystalloidal water-titanium sulphate-iron sulphate starting solution containing total g. p. l. of Ti calculated as $TiOSO_4$ and Fe calculated as $FeSO_4$ not less than 575 and not more than 915 and having an $Fe/TiO_2$ ratio of not less than 0.3 and not more than 0.62, (2) agitating the starting solution with not less than one part by volume of acetone, (3) forming from the mass resulting from step (2) a titanium sulphate solution layer and an acetone-acid-water layer, and (4) separating said layers to recover the titanium sulphate solution layer having acidity factor less than that of said starting solution.

11. The method for making a crystalloidal titanium sulphate solution of predetermined acidity factor by a plurality of acid extraction operations which method comprises (1) providing a crystalloidal water-titanium sulphate-iron sulphate starting solution of acidity factor not less than 40% and containing total g. p. l. of Ti calculated as $TiOSO_4$ and Fe calculated as $FeSO_4$ not less than 510 and not more than 1100 and having an $Fe/TiO_2$ ratio of not less than 0.2 and not more than 0.72, (2) agitating the starting solution with not less than 0.75 part by volume of a liquid extracting agent comprising a neutral organic oxygen containing compound, substantially non-reactive with sulphuric acid at room temperature, soluble in water, and having specific gravity not above 1.034 at 25° C., a molecular weight of 46.1–118.1, and a dielectric constant of 4–24.1, (3) forming from the mass resulting from step (2) a titanium sulphate solution layer and an extracting agent-acid-water layer, (4) separating said layers, (5) adding to the titanium sulphate solution layer, having acidity factor less than that of said starting solution, water in amount to form a mass of viscosity low enough to permit ready mixing with another volume of extracting agent, and (6) subjecting the diluted mass resulting from step (5) to further acid extraction operation comprising repetition of steps (2) to (5) inclusive, the final extraction operation comprising repetition of steps (2) to (4) inclusive, and the number of extraction operations being such as to effect formation of an ultimate separated titanium sulphate solution layer having said predetermined acidity factor.

L'ROCHE G. BOUSQUET.
DAVID W. YOUNG.
ALLAN W. LOW.